United States Patent [19]
Cramer

[11] 3,782,170
[45] Jan. 1, 1974

[54] OXYGEN ANALYZER
[75] Inventor: Howard A. Cramer, Tulsa, Okla.
[73] Assignee: Lowrance Electronics, Inc., Tulsa, Okla.
[22] Filed: Mar. 22, 1972
[21] Appl. No.: 237,105

[52] U.S. Cl. ................. 73/19, 204/1 T, 204/195 R
[51] Int. Cl. ...................... B01d 11/00, G01n 33/18
[58] Field of Search ...................... 73/19; 23/254 E; 204/195 R, 1 T, DIG. 5; 324/33, 36

[56] References Cited
UNITED STATES PATENTS
3,260,656  7/1966  Ross ................................. 204/1 T
3,315,271  4/1967  Hersch et al. .................. 204/195 R Primary Examiner—James J. Gill
Attorney—James R. Head et al.

[57] ABSTRACT

This invention describes a small instrument that can be inserted into a body of water or other liquid to make a determination of the concentration of free dissolved oxygen in the water. It comprises a cylindrical tube with an end plate and a permanent magnet placed coaxial with the tube with its south pole in contact with the end plate. The length of the magnet is approximately one half or less the length of the cylindrical tube. A pair of electrodes are positioned in the wall of the tube, approximately at the middle of the length of the tube. A disc having a number of holes to permit passage of water axially along the inside of the tube, is mounted across the cross section of the tube, closely spaced from the electrodes. When a battery is connected to the electrodes a current will flow. Negative ions will be deflected by the magnetic field toward the magnet and so will be intercepted by the grid. The magnitude of this current can be determined by a meter which is connected in the lead from the grid to the positive pole of the battery.

10 Claims, 3 Drawing Figures

PATENTED JAN 1 1974    3,782,170

3,782,170

OXYGEN ANALYZER

BACKGROUND OF THE INVENTION

This invention is related to the field of measurement of dissolved oxygen in liquids such as water, blood, etc. More particularly it is in the field of instruments which can be lowered by electrical conductor means into a body of fluid and/or fluid drawn within the body to make a determination of the oxygen content in the water at various levels therein.

In the prior art there are a number of instruments described which, in very complicated ways, measure the oxygen content of a small sample of a liquid, such as blood, etc. Complexity is required because of the difficulty of the measurement. These instruments are complicated, costly and difficult to operate and maintain. They would not be feasible for use in the outdoor environment, such as by fishermen to detect the depth of water where fish will most likely be found.

SUMMARY OF THE INVENTION

The principle object of this invention is to provide a simple, substantially self-contained instrument, that can be lowered by electrical cable into a stream, lake or other body of water, to measure the oxygen content of the water as a function of depth below the surface. This and other objects are achieved in the present invention in which the instrument comprises a tubular portion partially closed by an end wall through which a number of holes are drilled for the passage of water through the holes and axially along the tube. A cylindrical magnet of lesser diameter than the inner diameter of the tube is fastened to the end wall. It is of length slightly less than approximately half the length of the tube. The south pole is placed against the end wall, and creates a magnetic field from the north pole to the wall, through the wall and through the end plate to the south pole of the magnet. A pair of electrodes are mounted to the tube at diametrically opposite points, through which current is supplied by means of a battery at the end of the electrical cable. Placed between the electrodes and the north pole of the magnet is a transverse disc or grid which is perforated by a large number of holes so that water can pass therethrough. The disc, or grid, and the electrodes are made of non-magnetic materials and are preferably plated to minimize undesirable voltages due to galvanic action. When the battery is connected to the electrodes, at least a portion of the free oxygen molecules in the liquid between the poles will ionize. Because of the magnetic field the negative oxygen ions will be deflected and in their path will be intercepted by the transverse grid, causing a current flow from the grid, through a lead, through a microammeter to the positive pole of the battery. Because of the connection of the grid to the positive pole of the battery there will be an electrostatic field also attracting negative oxygen ions from between the electrodes to the grid. The amount of current from the grid to the meter is a measure of the negative ion concentration in the liquid, and thus a measure of the free oxygen contact of the liquid.

While the instrument of this invention is ideal for use by fishermen for locating zones at various depths where there is a high concentration of dissolved oxygen, it can be used also in pollution control, for measuring the deaeration caused by various pollutants, etc.

BRIEF DESCRIPTION OF THE DRAWINGS

This and other objects of this invention and a better understanding of the principles and details of the invention will be evident from the following description taken in conjunction with the appended drawings, in which.

DESCRIPTION OF THE PREFERRED EMBODIMENT

Figure 1:
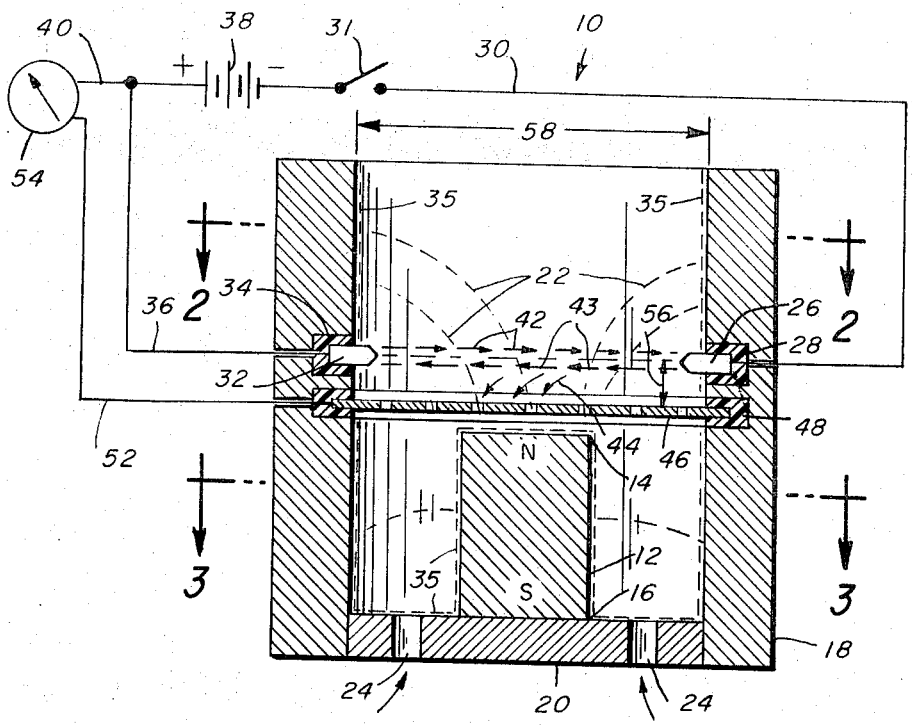
FIG. 1 is a cross section through the diametrical plane of the instrument.

Referring now to the drawings, the instrument shown is generally indicated by the numeral 10. A cylindrical tube 18 is closed at one end by a plate 20. The tube can be made of insulating material or insulating material containing ferromagnetic particles, or of steel with an insulating coating. There are a plurality of openings 24 so that when this cylinder is immersed in a liquid, there can be an axial flow of liquid along the inside of the tube 18. A cylindrical permanent magnet 12 is mounted coaxial with the tube and attached at its south pole to the plate 20. Flux will progress from the north end of the magnet, in accordance with the lines of force shown as 22, from the north end of the magnet, upward and radially outward to the wall 18.

At about the middle of the length of the tube 18 is a pair of electrodes 26 and 32. These are on opposite ends of a diameter and are inserted into insulating cups 28 and 34, as necessary. Leads 30 and 36 are connected respectively to the electrodes 26 and 32. Lead 36 connects to the positive end of a battery 38 while lead 30 connects to the negative end of the battery through a switch 31.

Mounted between the electrodes and the north pole of the magnet 12 is a grid, plate or disc 46 having a plurality of small openings 50. This is mounted to the wall of the tube, or in an insulating sleeve 48 inserted into the wall. A lead 52 goes from this grid to a microammeter 54 through lead 40 to the positive terminal of the battery.

Figure 2:
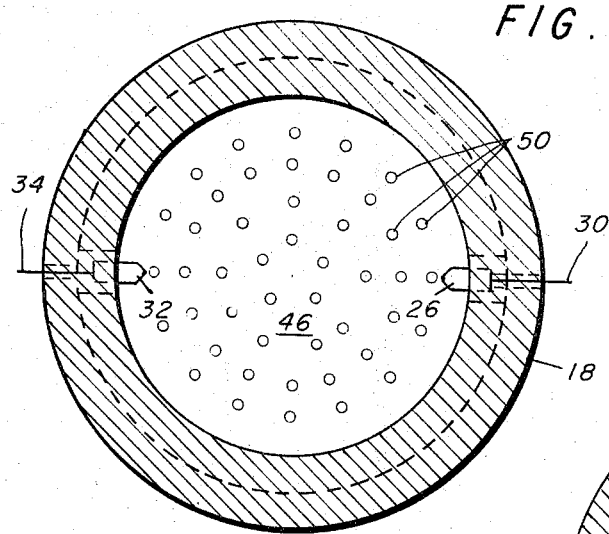
FIG. 2 is a transverse cross section through the instrument taken along the line 2—2.
Figure 3:
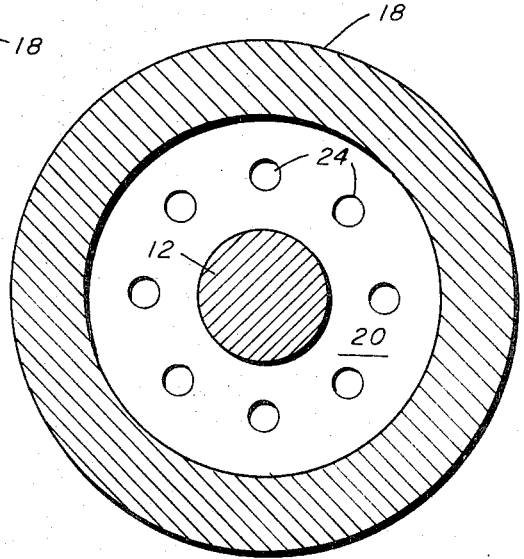
FIG. 3 is a transverse cross section of the instrument taken along the line 3—3.

There are no limitations on the dimensions of this device although it is preferable to make the spacing between the transverse plane through the electrodes and the plane of the disc or grid quite small and preferably of the order of one-eighth of an inch. The internal diameter of the tube can be conveniently about one inch in diameter. With an internal diameter of one inch the spacing between the two electrodes will be approximately 7/8 inch and the voltage of the battery 38 is conveniently set about 0.7 to 1.0 volt. It is important that the electrodes and the grid which are involved in the current collection be plated so as to decrease resistance to current flow and to eliminate any spurious voltages due to galvanic action. The plating may be of gold, rhodium, tantalum, etc. Also the leads from the electrodes and the grid should of course be fully insulated. If the tube is of magnetic material an insulating layer may be provided on the surface of the structure, as indicated by the dashed line 35. The views of the instrument shown on FIGS. 2 and 3 are self-explanatory.

When current is supplied by closing switch 31, positive ions indicated by the numeral 42 will flow from electrode 32 to electrode 26 and negative ions indicated by numeral 43 will flow from the negative electrode 26 to the positive electrode 32. The interaction between the negative ions and the magnetic field will be such that the negative ions will be deflected in a direction toward the grid 46, and so current will pass by way of lead 52, meter 54, lead 40, back to the battery. The magnitude of the negative ion current which is read by the meter 54 will be a measure of the negative oxygen ion content of the liquid.

Although openings 24 in the bottom plate and 50 in the grid are required so that the liquid in the inside of the tube can be changed to correspond to the new environment as the instrument is lowered into a body of liquid, it is clear that if there is a current of liquid axially through the instrument the velocity of which may be higher than when the axial velocity of the ions, the current flow to the grid will be effected by this velocity. The instrument should be held steady while the current measurement is being made.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. An instrument for measuring the concentration of oxygen in liquid, comprising:
   a. a support structure and means for creating a magnetic field inside said structure;
   b. means to fill at least part of the space inside said structure with liquid;
   c. a pair of electrodes immersed in said liquid;
   d. a metal grid immersed in said liquid and closely spaced to and parallel to the line joining said electrodes;
   e. means to connect a source of d. c. potential to said electrodes; and
   f. means connecting said grid to the positive side of said potential source
   g. means to measure the current flowing from said grid to said source of potential.

2. The instrument as in claim 1 in which said liquid is water.

3. The instrument as in claim 1 in which said instrument comprises a cup shaped structure with a cylindrical post attached to the bottom of said cup and shorter than the sidewall.

4. The instrument as in claim 3 in which said post is a permanent magnet with south pole attached to the base.

5. The instrument as in claim 3 in which said structure is ferromagnetic.

6. The instrument as in claim 4 in which said grid is above and transverse to the north pole of said magnet.

7. The instrument as in claim 6 in which electrodes are positioned above said grid.

8. The instrument as in claim 5 in which the surface of said structure is coated with an insulating layer.

9. The instrument as in claim 1 in which said electrodes and said grid are plated with a selected metal.

10. The instrument as in claim 9 in which said selected metal is gold.

* * * * *